Patented Oct. 30, 1945

2,388,199

UNITED STATES PATENT OFFICE 2,388,199

MINERAL OIL COMPOSITION

Robert H. Williams, Merchantville, and Everett W. Fuller Woodbury, N. J., assignors to Socony-Vacuum Oil Company, Incorporated, a corporation of New York No Drawing. Application April 14, 1943, Serial No. 483,070

16 Claims. (Cl. 252—32.7)

This invention relates to mineral oil compositions and more particularly relates to viscous mineral oil fractions of the type used for lubricants, dielectrics, and the like, which have been improved in one or more of their various properties by the addition thereto of an oil-improving agent.

It is well recognized by those familiar with the art that viscous mineral oil fractions tend to deteriorate when used as lubricants in present day internal combustion engines. In such use, these oil fractions develop substantial quantities of carbonaceous deposits which accumulate as sludge or "carbon deposits" impairing the free flow of the oil and which deposit about the piston rings causing them to stick. There is also developed, as the result of oxidation, appreciable acidity in the oil which has a deleterious effect upon contacted metals, particularly certain types of alloy bearing metals; and in the event the oil is being used as a dielectric, the development of acidity obviously reduces its efficiency in this respect. Also, the lubricating efficiency of viscous mineral oil fractions is reduced by virtue of the relatively large change in viscosity with change in temperatures of engine operation. Another shortcoming of viscous mineral oil fractions is their characteristic relatively high pour points which militates against their use at temperatures less than about 30° F.

A great many materials or mineral oil addition agents have been proposed for use in mineral oil fractions to counteract the aforesaid undesirable chemical and physical features thereof. In general, however, such materials as have been proposed are specific in improving but one property of the oil. For example, one such additive material may substantially improve chemical stability, such as the oxidation characteristics, of the oil, but will not improve, or may in fact impair, the viscosity characteristics or pour point of the oil. Correspondingly, another additive material may improve the physical characteristics, as by greatly decreasing the pour point, of the oil and not improve the oxidation characteristics thereof. Thus, a demand has been created for mineral oil addition agents which will improve an oil in several respects, such agents thereby earning the designation "multifunctional addition agents."

The present invention is predicated upon the discovery of a novel class of multifunctional mineral oil addition agents which will improve several important properties of the oil to which it is added in small amounts. Thus, the primary object of this invention is the provision of mineral oil compositions containing such improving agents.

The novel class of multifunctional improving agents of this invention are metal salts of the acidic phosphorus- and sulfur-containing reaction products obtained by reaction of phosphorus pentasulfide with an olefinic alcoholic material derived from petroleum wax, the olefin group or groups of such alcoholic material having at least about 18 carbon atoms.

The multifunctional oil improving agents contemplated herein are prepared in the following manner: first halogenating, as chlorinating, a paraffin wax obtained from petroleum to obtain a chlorinated paraffin wax or chlorowax; treating said chlorowax with aqueous alkali to obtain a product containing "wax alcohols" and "wax olefins" and small amounts of chlorinated "wax alcohols," chlorinated "wax olefins" and chlorowax; the product obtained in the preceding operation is reacted with phosphorus pentasulfide and the acidic phosphorus- and sulfur- containing reaction product obtained therefrom is neutralized with a metal hydroxide or oxide, or reacted with a suitable metal salt, to form the desired metal salt.

In order that the chemical nature of the multifunctional metal salts of this invention may be clearly understood, the general method of procedure outlined hereinabove will be elaborated upon in detail. The starting material for the improving agents contemplated herein is petroleum wax which, as is well known, is a paraffinic hydrocarbon fraction obtained from petroleum and has at least 18 carbon atoms in the molecule. A preferred petroleum wax for the purposes of this invention is one having a melting point not substantially less than about 120° F., a molecular weight of about 250 and about 20 carbon atoms in the molecule. To obtain a chlorinated wax or chlorowax, a suitable wax is heated, preferably to from about 200° F. to about 225° F., and contacted with gaseous chlorine. The weight increase of the wax represents the amount of chlorine substituted therein. As indicated hereinafter, a chlorowax having a chlorine content of from about 10 per cent to about 20 per cent is preferred.

The chlorowax obtained as described above is thereafter heated with aqueous alkali to replace chlorine with a hydroxyl group. This operation is best carried out with an aqueous alkali solution of about 10 per cent concentration, at a temperature from about 375° F. to about 500° F., for several hours. As sodium hydroxide is both inexpensive and available, it is preferred in this operation. The product obtained is predominantly a mixture of "wax alcohols" and "wax olefins" and contains small amounts of chlorinated "wax alcohols," chlorinated "wax olefins" and chlorowax. It will be apparent that the proportion of the "wax alcohols," as measured by the hydroxyl number, in the reaction product will vary considerably, and in this regard, those products having hydroxyl numbers from about 50 to about 200 are preferred. Analysis of the "wax alcohols," after separation of the same from the reaction product, indicates that the alcohols formed are olefinic in nature, and also indicates that these alcohols are, to a small degree, polymerized. While the "wax alcohols" may be separated from the reaction mixture obtained by treating chlorowax with aqueous caustic, and then reacted with phosphorus pentasulfide and the acidic reaction product therefrom converted to the corresponding metal salt, the reaction mixture containing "wax olefins" and the aforesaid chlorinated materials in small amounts in addition to the "wax alcohols" may similarly be converted to the metal salts of this invention. The metal salts in each case are multifunctional improving agents. Thus, in addition to metal, phosphorus and sulfur, chlorine may also be present in our improving agents.

We have found, however, that the foregoing treatment of chlorowax with aqueous alkali may be modified to obtain a reaction product containing a substantially larger proportion of "wax alcohols" than that obtained by the procedure described above. This has been accomplished by using small amounts, such as about 10 per cent, of oleic acid, stearic acid or similar long-chain aliphatic acid, with the reactants, chlorowax and aqueous alkali. The reaction is also facilitated by using a small amount of water-soluble sulfonates in the reaction mixture, the sulfonates probably providing a more intimate contact of the reactants.

Phosphorus and sulfur are introduced into the multifunctional improving agents of this invention by reacting either the olefinic alcoholic reaction product or the "wax alcohols" separated therefrom, with phosphorus pentasulfide. In this reaction, a sufficient amount of phosphorus pentasulfide is used to react with the hydroxyl group of said alcoholic reactant, the amount of pentasulfide required being determined from the hydroxyl number of the alcoholic reactant. Additional phosphorus and sulfur may be introduced by using an excess of said pentasulfide. Apparently, the excess pentasulfide reacts with the double bonds or the olefin portion of the alcoholic reactant. The reaction temperature of this operation may be from about 120° F. to about 400° F., however, temperatures in the neighborhood of 200° F. to 300° F. are preferred.

Also contemplated as acidic phosphorus- and sulfur-containing reaction products for the purposes of this invention are those reaction products obtained by first sulfurizing the aforesaid olefinic alcoholic reaction product or the aforesaid "wax alcohols" with elementary sulfur, and then reacting the sulfurized product, thus obtained, with phosphorus pentasulfide according to the procedure described above. In the sulfurization reaction, it is most probable that the double bonds of the olefinic alcoholic reaction product or of the "wax alcohols" enter into reaction with sulfur.

It will be apparent from the complex nature of the olefinic alcoholic reactant that the products obtained with phosphorus pentasulfide, or with sulfur followed with said pentasulfide, are most accurately described as acidic, phosphorus- and sulfur-containing reaction products, rather than as definite compounds. It is probable, however, that these acidic reaction products do contain several types of phosphorus- and sulfur-containing compounds, one type of which may be the dialkyl dithiophosphoric acids in which the alkyl constituents are the olefin groups derived from wax. It will be apparent also from the foregoing that said alkyl constituents may be olefin groups containing sulfur, or containing both sulfur and phosphorus. As will be demonstrated hereinafter, the metal salts of this invention are superior to the well-known metal salts of dialkyl dithiophosphoric acids, such as for example, barium dioleyl dithiophosphate, in that they effect a substantial improvement in the pour point of an oil; whereas, said barium salt does not lower, and in some cases may even raise, the pour point of the oil.

The final products of this invention, namely, the multifunctional metal salts of the aforesaid acidic, phosphorus- and sulfur-containing reaction products, are preferably prepared by reacting a metal hydroxide with said acidic reaction products. It will be obvious that in this neutralization reaction, the acid hydrogen atoms of said acidic reaction products are substituted with metal. The conditions of this reaction will be apparent from the examples provided hereinafter. Metals so introduced by reaction of their corresponding hydroxides may, of course, be replaced by other metals in a subsequent reaction, as by metathesis with a metal halide, etc. As contemplated herein, any metal may be present in our multifunctional improving agents. Particular preference, however, is given to the metals, barium, calcium, and zinc.

In order that the character of the metal salts of this invention may be better understood several illustrative examples are set forth below.

EXAMPLE 1

(a) Preparation of Chlorinated Paraffin Wax

Gaseous chlorine was passed through a paraffin wax (ASTM melting point, 126° F.) heated to 200–222° F. until the weight of the wax increased about 14 per cent. The product was then blown with nitrogen to remove excess chlorine and occluded hydrogen chloride. A yellow liquid containing about 16.3% chlorine was obtained by filtering the product at 70° F. through paper.

(b) Preparation of Wax Alcoholic Material

Three hundred (300) grams of the chlorowax obtained in (a) were placed in a shaker bomb along with 54 grams of sodium hydroxide, 500 grams of distilled water, 12 grams of oleic acid and 9 grams of water-soluble sulfonates. The bomb was heated and agitated for about eight hours during which time the temperature was about 400° F., but varied from 390° F. to 480° F. At the end of eight hours the product was removed from the bomb and cooled. Benzol was then added to the product. An aqueous layer and a benzol layer containing the desired alcoholic reaction product were formed. The benzol layer was separated from the aqueous layer and washed with water. The benzol layer was filtered and distilled to a maximum temperature of 266° F. at 10 mms. pressure. In this way 250 grams of a red oily product which solidified upon cooling were obtained. On analysis, the alcoholic material had the following characteristics: per cent chlorine= 3.74, hydroxyl number=56, and iodine number= 63.2.

(c) Preparation of Acidic Phosphorus- and Sulfur- Containing Product of (b)

A quantity, 203 grams, of the wax alcoholic material prepared in (b) and 55 grams of phosphorus pentasulfide were heated at 200° F. for 2¼ hours. The product was then cooled, diluted with light naphtha (boiling range 200–300° F.), filtered and distilled to a maximum temperature of 212° F. at 10 mms. pressure. The red oily product, 229 grams, is identified by the following characteristics: per cent phosphorus=2.56, per cent sulfur=7.16, per cent chlorine=3.13 and neutralization number (N. N.)=30.

(d) PREPARATION OF BARIUM SALT OF (c)

The barium salt of the acidic reaction product obtained in (c) was formed by agitating and heating 200 grams of said reaction product (c), 35 grams of $Ba(OH)_2 \cdot 8H_2O$ and 75 c. c. of methyl alcohol at the reflux temperature for 15 minutes. The product was diluted with a light naphtha whereupon a water-alcohol layer and a naphtha layer containing the desired barium salt were formed. The naphtha layer was separated from the water-alcohol layer and filtered. The light naphtha was distilled from the filtrate to obtain the product (200 grams) which was a viscous liquid or low melting solid depending upon the temperature. It analyzed as follows: per cent phosphorus=2.25, per cent sulfur=4.7, per cent barium=5.6, per cent chlorine=291, and neutralization number (N. N.)=0.3.

EXAMPLE 2

(a) PREPARATION OF CHLORINATED PARAFFIN WAX

A quantity of chlorowax was prepared by the same procedure described in Example 1 (a) above.

(b) PREPARATION OF WAX ALCOHOLIC MATERIAL

Four hundred (400) grams of chlorowax obtained in (a) were heated in a rocking bomb for three hours with 74.5 grams of sodium hydroxide, 740 grams of water and 40 grams of stearic acid. The temperature during the three hour reaction period varied from 400° F. to 520° F. The warm oily product was filtered after being separated from the water layer. Stearic acid was separated from the product by filtering with suction at room temperature. The crude product, wax alcoholic material, was a red oil, weighed 360 grams and analyzed as follows: per cent chlorine=1.3, hydroxyl number=74, and iodine number=64.

The crude product was extracted with six successive portions of 200 c. c. of denatured ethyl alcohol. The alcohol portions were combined and the ethyl alcohol evaporated therefrom. A quantity of "wax alcohols," a yellow oil, was obtained; this represented about 35.5% of the crude product used. The "wax alcohols" analyzed as follows: per cent chlorine=1.1, hydroxyl number=156, and iodine number=60.

(c) SULFURIZATION OF "WAX ALCOHOLS" (b)

One hundred (100) grams of the "wax alcohols" obtained in (b) were heated at about 290° F. for twelve hours with 5.5 grams of sulfur in the presence of 100 grams of xylene. The reaction product was filtered and the filtrate obtained thereby was distilled to remove xylene, to a maximum temperature of 300° F. at 5 mms. pressure. A brown-red oil, 102 grams, was thus obtained. This product was not corrosive as evidenced by a copper strip test.

(d) PREPARATION OF ACIDIC PHOSPHORUS- AND SULFUR- CONTAINING REACTION PRODUCT OF (c)

Ninety-six (96) grams of the sulfurized wax alcohols from (c), 15 grams of phosphorus pentasulfide and 75 c. c. of a light naphtha were heated and stirred at 212° F. for 2½ hours.

(e) BARIUM SALT OF (d)

The reaction product obtained in (d) was further diluted with light naphtha, filtered and the filtrate neutralized with 22 grams of barium hydroxide. The neutralization was effected at 130° F. for ½ hour. The barium salt (109 grams) recovered was an extremely viscous liquid. It is identified by the characteristics: per cent phosphorus=3.45, per cent sulfur=14.5, per cent barium=7.7, and per cent chlorine=1.0.

EXAMPLE 3

(a) PREPARATION OF CHLORINATED PARAFFIN WAX

A quantity of chlorowax was prepared by the procedure described in Example 1 (a) above.

(b) PREPARATION OF WAX ALCOHOLIC MATERIAL

A mixture of 400 grams of chlorowax, (obtained in (a)), 72 grams of sodium hydroxide, 720 grams of distilled water and 40 grams of oleic acid was heated in a rocking autoclave at 440° F. to 463° F. for 6½ hours. The reaction mixture taken from the autoclave was in the form of an emulsion. A small quantity of ethyl alcohol was added to the reaction mixture to break the emulsion, and after separation of the water layer the alcohol was removed by distillation. Stoddards solvent was added to the distillation residue, and the resulting solution was filtered to remove sodium oleate which had been in solution in the alcohol. The filtrate was water-washed, filtered and the solvent removed by distilling to a maximum temperature of 338° F. at 2 mms. pressure. The product (256 grams) was a waxy material identified by the following properties: per cent chlorine=0.52, hydroxyl number=91, and iodine number =62.

(c) PREPARATION OF ACIDIC PHOSPHORUS- AND SULFUR-CONTAINING REACTION PRODUCT OF (b)

One hundred and three (103) grams of the waxy product obtained in (b) were reacted with 10 grams of phosphorus pentasulfide at 212° F. for four hours with stirring. The reaction product was diluted with about 100 c. c. of a light naphtha (boiling range 200–300° F.) and filtered to remove unreacted phosphorus pentasulfide. In this way, 220 c. c. of a yellow solution containing the acidic phosphorus- and sulfur-containing reaction product, were obtained.

(d) PREPARATION OF CALCIUM SALT OF (c)

One-half (110 c. c.) of the solution obtained in (c) was neutralized with 2 grams of calcium hydroxide in methyl alcohol. The reaction product was distilled to remove methyl alcohol, and the residue filtered to remove unreacted calcium hydroxide. The remaining solvent was removed by distilling the filtrate obtained in the preceding step, to a maximum temperature of 300° F. at 10 mms. pressure. The product, 53 grams of a dark red oil, is identified by the following: per cent calcium=1.46, per cent phosphorus=1.93, and per cent sulfur=3.9.

(e) PREPARATION OF ZINC SALT OF (c)

One-half (110 c. c.) of the solution obtained in (c) was further diluted with a medium heavy naphtha (boiling range 275–350° F.), and 5 grams of zinc acetate $(CH_3COO)_2Zn \cdot 2H_2O$), moistened with 2 c. c. of water, were added thereto. Upon heating and stirring the reaction mixture to 300°

F., acetic acid was distilled off. The reaction mixture was then filtered and the filtrate distilled to a maximum flask temperature of 320° F. at 10 mms. pressure. The product, 59 grams of a light red oil, has the following characteristics: per cent zinc=1.81, per cent phosphorus=1.89, and per cent sulfur=4.2.

EXAMPLE 4

(a) PREPARATION OF CHLORINATED PARAFFIN WAX

Gaseous chlorine was passed through a quantity of a paraffin wax (ASTM melting point, 126° F.) at 200-220° F. until the weight of the wax increased about 16 per cent. It was then blown with nitrogen to remove excess chlorine and occluded hydrochloric acid.

(b) PREPARATION OF WAX ALCOHOLIC MATERIAL

Into a stirring autoclave were charged 300 grams of the chlorowax obtained in (a), 50 grams of sodium hydroxide, 650 grams of distilled water and 13 grams of oleic acid. The reaction was carried out for 5⅓ hours at 400° F. to 440° F., and thereafter for three hours at 450° F. to 470° F. The reaction product was discharged from the autoclave and the organic layer separated from the aqueous layer which formed on standing. The organic layer was diluted with light naphtha, filtered and distilled to a maximum temperature of 300° F. at 10 mms. pressure. The product (270 grams) analyzed as follows: per cent chlorine=2.1, hydroxyl number=50, and iodine number=73.

A portion (115 grams) of the crude product identified above was extracted with three successive and equal portions of isopropyl alcohol. The alcohol extracts obtained were combined and the alcohol distilled therefrom. A yellow oil, which represented 41% of the crude product used, was obtained. On analysis, this oil had the following characteristics: per cent chlorine=1.32, hydroxyl number=107, and iodine number=75.

(c) PREPARATION OF ACIDIC, PHOSPHORUS- AND SULFUR- CONTAINING REACTION PRODUCT OF (b)

Forty (40) grams of the product obtained in (b) were reacted with 5 grams of phosphorus pentasulfide at 200° F. for five hours. The reaction product was diluted with light naphtha and the naphtha solution was then filtered to remove unreacted pentasulfide.

(d) PREPARATION OF BARIUM SALT OF (c)

The light naphtha solution containing the acidic, phosphorus- and sulfur- containing reaction product, obtained in (c), was neutralized with barium hydroxide. The reaction mixture obtained in the preceding operation was filtered and the filtrate diluted with 40 grams of an oil having a Saybolt Universal viscosity of 45 at 210° F. The resulting oil blend was then distilled to a maximum temperature of 212° F. at 5 mms. pressure, to remove naphtha therefrom. The product (82 grams) was a viscous oil identified on analysis by the following: per cent barium=3.48, per cent phosphorus=1.15, per cent sulfur=2.17, per cent chlorine=0.42, and neutralization number (N. N.)=0.20. These analytical data are for the product as obtained which is, as indicated above, an oil blend; the concentrations used in the tests shown hereinafter are, however, based upon the pure undiluted product.

To demonstrate the effectiveness of reaction products or compounds of the type described above in the mineral oil compositions contemplated by this invention, we have conducted several comparative tests, the results of which are listed below with representative mineral oils alone and with the same oils blended with various representative metal salts of acidic, phosphorus- and sulfur-containing reaction products.

POUR TEST

This series of tests was conducted with a mineral lubricating oil fraction having a Saybolt Universal viscosity of 67 seconds at 210° F. and an ASTM pour point of 20° F. The blank oil and oil blends were tested at the same time. To emphasize the substantial pour depressant action of the metal salts of this invention, a blend of said oil and an intermediate reaction product, an acidic phosphorus- and sulfur- containing reaction product, was also tested. Also, oil blends of two typical metal salts of dialkyl dithiophosphoric acids were so tested and the results included below in order to show the superiority of the metal salts of this invention thereover. The metal salts, and intermediate reaction product, of this invention are identified in Table 1 below by the designation Example 1 (c), Example 2 (e), etc. The results of these pour tests are listed below in Table 1.

*Table 1*

| Improving agent | Concentration, per cent | ASTM pour test | |
|---|---|---|---|
| | | Blend | Blank |
| Example 1 (c) (intermediate acidic product) | | | |
| Example 1 (d) (barium salt of 1 (c)) | 1 | +20 | +15 |
| Example 2 (e) (barium salt of 2 (d)) | 1 | −10 | +15 |
| Do | 1 | −30 | +20 |
| Example 3 (d) (calcium salt of 3 (c)) | 0.5 | −15 | +20 |
| Example 3 (e) (zinc salt of 3 (c)) | 1 | −15 | +20 |
| Do | 2 | −15 | +20 |
| Example 4 (d) (barium salt of 4 (c)) | 1.5 | 0 | +20 |
| | 1.5 | −25 | +20 |
| Barium dioleyl dithiophosphate | 1 | +20 | +20 |
| Zinc distearyl dithiophosphate | 1 | +25 | +20 |

From the foregoing results it will be observed that the metal salts (Examples: 1 (d), 2 (e), 3 (d), 3 (e), and 4 (d)) contemplated by this invention, when present in a mineral lubricating oil in amounts as small as 0.5 per cent, are effective in depressing the pour point of the oil by an appreciable amount. It will also be observed that a corresponding acidic, phosphorus- and sulfur-containing product which does not contain metal does not depress the pour point of the oil. The foregoing results also reveal that the closely-related metal salts of dialkyl dithio-phosphoric acids, which do not contain alkyl groups of the type contemplated by this invention, do not improve the pour point of the oil, and, in some cases, actually raise the pour point of the oil.

CORROSION TEST

In addition to the foregoing pour tests we have also made tests of an oil and oil blends containing representative improving agents of the type contemplated herein to determine the comparative behavior of the unblended oil and the improved oil compositions toward metal bearings.

Motor oils, especially those refined by certain solvent-extraction methods, tend to oxidize when submitted to high temperatures and to form products that are corrosive to metal bearings. This corrosive action may be quite severe with certain bearings, such as those having the corrosion-susceptibility of cadmium-silver alloys; and may cause their failure within a comparatively short time. The following test was used to determine the corrosive action of a motor oil on an automobile connecting rod bearing.

The oil used consisted of Pennsylvania neutral and residuum stocks separately refined by means of chlorex and then blended to give an S. A. E. 20 motor oil with a specific gravity of 0.872, a flash point of 435° F., and a Saybolt Universal viscosity of 318 seconds at 100° F. The oil was tested by adding a section of a bearing containing a cadmium-silver alloy surface and weighing about 6 grams, and heating it to 175° C. for twenty-two hours while a stream of air was bubbled against the surface of the bearing. The loss in weight of the bearing during this treatment measures the amount of corrosion that has taken place. A sample of the oil containing an improving agent was run at the same time as a sample of the straight oil, and the loss in weight of the bearing section in the inhibited oil can thus be compared directly with the loss in weight of the section in the uninhibited oil. The results obtained in this test are set forth in Table 2 below.

Table 2

| Improving agent | Concentration, per cent | Mgs. loss in weight | |
|---|---|---|---|
| | | Inhibited | Uninhibited |
| Example 1 (d) (barium salt) | 0.10 | 0 | 45 |
| Do | 0.25 | 0 | 45 |
| Do | 0.50 | 0 | 45 |
| Example 2 (e) (barium salt) | 0.10 | 0 | 39 |
| Do | 0.20 | 0 | 39 |
| Do | 0.50 | 0 | 39 |
| Example 3 (d) (calcium salt) | 0.25 | 0 | 36 |
| Do | 0.50 | 0 | 36 |
| Example 3 (e) (zinc salt) | 0.25 | 0 | 36 |
| Do | 0.50 | 0 | 36 |
| Example 4 (d) (barium salt) | 0.10 | 0 | 33 |
| Do | 0.25 | 0 | 33 |
| Do | 0.50 | 0 | 33 |

It is apparent from the foregoing results that the metal salts of this invention are extremely effective in inhibiting the corrosive action of mineral oils upon bearing metals, particularly those of the cadmium-silver type.

OPERATION TESTS

We have also carried out tests of an oil and an oil blend containing a representative improving agent of the type contemplated by this invention to determine the comparative behavoir of the unblended oil and the improved oil compositions under actual operating conditions.

(a) LAUSON ENGINE TEST

In this test, a single cylinder Lauson engine was operated with an oil temperature of 290° F. and a jacket temperature of 212° F. The oil used was an S. A. E. 10 motor oil, solvent refined, and the oil blend used was a blend of said oil and a typical metal salt, the barium salt (Example 1 (d)) of an acidic, phosphorus- and sulfur- containing reaction product. The neutralization number (N. N.) and viscosity in centistokes at 210° F., of the oil blank and oil blend, were determined after several time intervals. The results are shown below in Table 3.

Table 3

| | Neutralization number (N. N.) | | | K. v. @ 210° F. | | |
|---|---|---|---|---|---|---|
| | 12 hrs. | 24 hrs. | 36 hrs. | 12 hrs. | 24 hrs. | 33 hrs. |
| Oil alone | 2.20 | 4.80 | 8.30 | 6.27 | 8.13 | 11.80 |
| Oil+1% Example 1 (d) | 0.90 | 1.30 | 1.50 | 6.08 | 6.44 | 6.54 |

The results shown in Table 3 clearly indicate that an oil containing a small quantity of a typical metal salt of this invention is greatly superior to a blank mineral oil during operation in that less acidity is developed and the viscosity characteristics of the oil are substantially unchanged therein.

(b) RING STICKING TEST

This test was carried out in a single cylinder CFR engine cooled with a diethylene glycol-water mixture held at a temperature of about 390° F. The engine was operated continuously over a time interval of twenty-eight hours at a speed of about 1200 R. P. M., which is equivalent to a road speed of about twenty-five miles per hour. The oil temperature was held at about 150° F. during the test.

The conditions observed at the end of the test were (a) the extent to which the piston rings were stuck, (b) the extent to which the slots in the oil rings were filled with deposits, (c) the amount of carbonaceous deposits in the oil, and (d) the neutralization number (acidity) of the oil at the end of the test. The oil used was a lubricating oil stock of 120 seconds S. U. V. @ 210° F. and the results, which are recorded in Table 4 below, show a marked improvement in mineral oil compositions of the type contemplated herein over the oil alone.

In running these tests a comparative run was made with a sample of the blank oil and a sample of the oil containing the improving agent. In Table 4, Example 1 (d) is the designation of the barium salt of an acidic phosphorus- and sulfur- containing reaction product which was prepared above.

Table 4

| | Ring condition | | | | | | | | Grams carbon deposit | N. N. | K. v. @ 210° F. |
|---|---|---|---|---|---|---|---|---|---|---|---|
| | Degrees stuck | | | | | Per cent slots filled | | | | | |
| | 1 | 2 | 3 | 4 | 5 | 3 | 4 | 5 | | | |
| Oil alone | 360 | T | 360 | 360 | 360 | 70 | 80 | 40 | 13.8 | 2.2 | 30.74 |
| Oil+1% Example 1(d) | 240 | 0 | 60 | 0 | 0 | Tr | Tr | 0 | 7.5 | 1.7 | 28.48 |

T=tacky; Tr=trace.

The data presented in Table 4 clearly indicate that the metal salts of this invention, as typified by the barium salt used, improve the stability of the oil and also provide a clean engine during operation.

The metal salts of acidic, phosphorus- and sulfur- containing reaction products contemplated herein may be used in the oil in various amounts, depending upon the character of the oil, the degree of improvement of the oil to be obtained, the conditions under which it is to be used, etc. In general, it appears that the desired improvement of the oil may be effected with these metal salts in amounts ranging from about 0.05 per cent to about 5.0 per cent.

It is to be understood that while we have herein described certain typical procedures for making the oil addition agents of this invention and have referred to certain reaction products and mineral oils, the invention is not limited to these specific features of the description but includes variations of the procedures which will be apparent to those skilled in the art and other typical metal salts and petroleum products coming within the scope of the appended claims.

We claim:

1. An improved mineral oil composition comprising a viscous mineral oil fraction having in admixture therewith a minor proportion, sufficient to depress the pour point of said oil fraction, of a metal salt of an acidic, phosphorus- and sulfur- containing reaction product, said reaction product having been obtained by reaction of phosphorus pentasulfide and an olefinic alcohol, and said olefinic alcohol having been obtained by first halogenating a petroleum wax having at least twenty carbon atoms to form a halogenated petroleum wax and thereafter substantially dehalogenating said halogenated petroleum wax with aqueous alkali to form said olefinic alcohol, said salt possessing pour point depressant action.

2. An improved mineral oil composition comprising a viscous mineral oil having in admixture therewith a minor proportion, sufficient to depress the pour point of said oil, of a metal salt of an acidic, phosphorus- and sulfur- containing reaction product, said reaction product having been obtained by reaction of phosphorus pentasulfide and sulfurized olefinic alcohol, and said sulfurized olefinic alcohol having been obtained by first halogenating a petroleum wax having at least twenty carbon atoms to form a halogenated petroleum wax, then substantially dehalogenating said halogenated petroleum wax with aqueous alkali to form an olefinic alcohol and thereafter reacting said olefinic alcohol with elementary sulfur to form said sulfurized olefinic alcohol, said salt possessing pour point depressant action.

3. An improved mineral oil composition comprising a viscous mineral oil having in admixture therewith a minor proportion, sufficient to depress the pour point of said oil, of a metal salt of an acidic, phosphorus- and sulfur- containing reaction product, said reaction product having been obtained by reaction of elementary sulfur and an intermediate acidic, phosphorus- and sulfur- containing reaction product obtained by reaction of phosphorus pentasulfide and an olefinic alcohol, and said olefinic alcohol having been obtained by first halogenating a petroleum wax having at least twenty carbon atoms to form a halogenated petroleum wax and thereafter substantially dehalogenating said halogenated petroleum wax with aqueous alkali to form said olefinic alcohol, said salt possessing pour point depressant action.

4. An improved mineral oil composition comprising a viscous mineral oil having in admixture therewith a minor proportion, sufficient to depress the pour point of said oil, of a metal salt of an acidic, phosphorus- and sulfur- containing reaction product, said reaction product having been obtained by reaction of phosphorus pentasulfide and an olefinic alcohol, and said olefinic alcohol having been obtained by first chlorinating a petroleum wax having at least twenty carbon atoms to form a chlorinated petroleum wax and thereafter substantially dechlorinating said chlorinated petroleum wax with aqueous alkali to form said olefinic alcohol, said salt possessing pour point depressant action.

5. An improved mineral oil composition comprising a viscous mineral oil having in admixture therewith a minor proportion, sufficient to depress the pour point of said oil, of a barium salt of an acidic, phosphorus- and sulfur- containing reaction product, said reaction product having been obtained by reaction of phosphorus pentasulfide and a sulfurized olefinic alcohol, and said sulfurized olefinic alcohol having been obtained by first halogenating a petroleum wax having at least twenty carbon atoms to form a halogenated petroleum wax, then substantially dehalogenating said halogenated petroleum wax with aqueous alkali to form an olefinic alcohol and thereafter reacting said olefinic alcohol with elementary sulfur to form said sulfurized olefinic alcohol, said salt possessing pour point depressant action.

6. An improved mineral oil composition comprising a viscous mineral oil having in admixture therewith a minor proportion, sufficient to depress the pour point of said oil, of a barium salt of an acidic, phosphorus- and sulfur- containing reaction product, said reaction product having been obtained by reaction of phosphorus pentasulfide and an olefinic alcohol, and said olefinic alcohol having been obtained by first chlorinating a petroleum wax having at least twenty carbon atoms to form a chlorinated petroleum wax and thereafter substantially dechlorinating said chlorinated petroleum wax with aqueous alkali to form said olefinic alcohol, said salt possessing pour point depressant action.

7. An improved mineral oil composition comprising a viscous mineral oil having in admixture therewith a minor proportion, sufficient to depress the pour point of said oil, of a calcium salt of an acidic, phosphorus- and sulfur- containing reaction product, said reaction product having been obtained by reaction of phosphorus pentasulfide and an olefinic alcohol, and said olefinic alcohol having been obtained by first chlorinating a petroleum wax having at least twenty carbon atoms to form a chlorinated petroleum wax and thereafter substantially dechlorinating said chlorinated petroleum wax with aqueous alkali to form said olefinic alcohol, said salt possessing pour point depressant action.

8. A multifunctional mineral oil improving agent possessing pour-depressant properties, comprising a metal salt of an acidic, phosphorus- and sulfur- containing reaction product, said reaction product having been obtained by reaction of phosphorus pentasulfide and an olefinic alcohol, and said olefinic alcohol having been obtained by first halogenating a petroleum wax having at least twenty carbon atoms to form a halogenated petroleum wax and thereafter substantially dehalogenating said halogenated petroleum wax with aqueous alkali to form said olefinic alcohol.

9. A multifunctional mineral oil improving agent possessing pour-depressant properties, comprising a metal salt of an acidic, phosphorus- and sulfur- containing reaction product, said reaction product having been obtained by reaction of phosphorus pentasulfide and a sulfurized olefinic alcohol, and said sulfurized olefinic alcohol having been obtained by first halogenating a petroleum wax having at least twenty carbon atoms to form a halogenated petroleum wax, then substantially dehalogenating said halogenated petroleum wax with aqueous alkali to form an olefinic alcohol and thereafter reacting said olefinic alcohol with elementary sulfur to form said sulfurized olefinic alcohol.

10. A multifunctional mineral oil improving agent possessing pour-depressant properties, comprising a metal salt of an acidic, phosphorus- and sulfur- containing reaction product, said reaction product having been obtained by reaction of elementary sulfur and an intermediate acidic, phosphorus- and sulfur- containing reaction product obtained by reaction of phosphorus pentasulfide and an olefinic alcohol, and said olefinic alcohol having been obtained by first halogenating a petroleum wax having at least twenty carbon atoms to form a halogenated petroleum wax and thereafter substantially dehalogenating said halogenated petroleum wax with aqueous alkali to form said olefinic alcohol.

11. A multifunctional mineral oil improving agent possessing pour-depressant properties, comprising a metal salt of an acidic, phosphorus- and sulfur- containing reaction product, said reaction product having been obtained by reaction of phosphorus pentasulfide and an olefinic alcohol, and said olefinic alcohol having been obtained by first chlorinating a petroleum wax having at least twenty carbon atoms to form a chlorinated petroleum wax and thereafter substantially dechlorinating said chlorinated petroleum wax with aqueous alkali to form said olefinic alcohol.

12. A multifunctional mineral oil improving agent possessing pour-depressant properties, comprising a barium salt of an acidic, phosphorus- and sulfur- containing reaction product, said reaction product having been obtained by reaction of phosphorus pentasulfide and a sulfurized olefinic alcohol, and said sulfurized olefinic alcohol having been obtained by first halogenating a petroleum wax having at least twenty carbon atoms to form a halogenated petroleum wax, then substantially dehalogenating said halogenated petroleum wax with aqueous alkali to form an olefinic alcohol and thereafter reacting said olefinic alcohol with elementary sulfur to form said sulfurized olefinic alcohol.

13. A multifunctional mineral oil improving agent possessing pour-depressant properties, comprising a barium salt of an acidic, phosphorus- and sulfur- containing reaction product, said reaction product having been obtained by reaction of phosphorus pentasulfide and an olefinic alcohol, and said olefinic alcohol having been obtained by first chlorinating a petroleum wax having at least twenty carbon atoms to form a chlorinated petroleum wax and thereafter substantially dechlorinating said chlorinated petroleum wax with aqueous alkali to form said olefinic alcohol.

14. A multifunctional mineral oil improving agent possessing pour-depressant properties, comprising a calcium salt of an acidic, phosphorus- and sulfur- containing reaction product, said reaction product having been obtained by reaction of phosphorus pentasulfide and an olefinic alcohol, and said olefinic alcohol having been obtained by first chlorinating a petroleum wax having at least twenty carbon atoms and thereafter substantially dechlorinating said chlorinated petroleum wax with aqueous alkali to form said olefinic alcohol.

15. A pour point depressant for mineral oils comprising a metal salt of an acidic, phosphorus- and sulfur- containing reaction product, said reaction product having been obtained by reaction of phosphorus pentasulfide and an olefinic alcohol, and said olefinic alcohol having been obtained by halogenating a petroleum wax to form a halogenated petroleum wax having at least twenty carbon atoms and thereafter substantially dehalogenating said halogenated petroleum wax with aqueous alkali to form said olefinic alcohol.

16. An improved mineral oil composition comprising a viscous mineral oil having in admixture therewith a minor proportion, from about 0.05 per cent to about 5.0 per cent, sufficient to depress the pour point of said oil, of a metal salt of an acidic, phosphorus- and sulfur- containing reaction product, said reaction product having been obtained by reaction of phosphorus pentasulfide and an olefinic alcoholic material, and said olefinic alcoholic material having been obtained by first halogenating a petroleum wax having at least twenty carbon atoms to form a halogenated petroleum wax and thereafter substantially dehalogenating said halogenated petroleum wax with alkali to form said olefinic alcoholic material.

ROBERT H. WILLIAMS.
EVERETT W. FULLER.

Patent No. 2,388,199.

Certificate of Correction

October 30, 1945.

ROBERT H. WILLIAMS ET AL.

It is hereby certified that errors appear in the printed specification of the above numbered patent requiring correction as follows: Page 2, second column, line 73, after the word "CONTAINING" insert REACTION; page 5, first column, line 52, for "behavoir" read *behavior*; page 6, first column, line 50, claim 2, before "sulfurized" insert *a*; and that the said Letters Patent should be read with these corrections therein that the same may conform to the record of the case in the Patent Office.

Signed and sealed this 9th day of April, A. D. 1946.

[SEAL]

LESLIE FRAZER,
*First Assistant Commissioner of Patents.*